United States Patent
Nakanishi et al.

(10) Patent No.: US 7,666,540 B2
(45) Date of Patent: Feb. 23, 2010

(54) FUEL CELL SYSTEM AND VEHICLE WITH FUEL CELL SYSTEM MOUNTED THEREON

(75) Inventors: Haruyuki Nakanishi, Susono (JP); Keiichi Nakata, Susono (JP); Masafumi Kobayashi, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 754 days.

(21) Appl. No.: 10/556,606

(22) PCT Filed: Feb. 20, 2004

(86) PCT No.: PCT/JP2004/002016
§ 371 (c)(1),
(2), (4) Date: Nov. 14, 2005

(87) PCT Pub. No.: WO2004/102716
PCT Pub. Date: Nov. 25, 2004

(65) Prior Publication Data
US 2006/0251949 A1 Nov. 9, 2006

(30) Foreign Application Priority Data
May 19, 2003 (JP) .................. 2003-140987

(51) Int. Cl.
*H01M 8/02* (2006.01)
(52) U.S. Cl. .......................... 429/38; 429/22
(58) Field of Classification Search ............ 429/22, 429/38
See application file for complete search history.

(56) References Cited

U.S. PATENT DOCUMENTS

| | | | |
|---|---|---|---|
| 4,400,253 A | 8/1983 | Prestridge et al. | |
| 4,729,932 A | 3/1988 | McElroy | |
| 4,756,718 A * | 7/1988 | Ueno et al. | 29/623.5 |
| 6,391,268 B1 | 5/2002 | Berry et al. | |
| 6,475,655 B1 | 11/2002 | Nakanishi et al. | |
| 2002/0025459 A1 | 2/2002 | Agar et al. | |
| 2003/0134167 A1 * | 7/2003 | Hirakata | 429/22 |

FOREIGN PATENT DOCUMENTS

| | | | |
|---|---|---|---|
| EP | 0 343 679 A | | 11/1989 |
| JP | 07-230817 A | | 8/1995 |
| JP | 09266004 A | * | 10/1997 |
| JP | 2002-184430 A | | 6/2002 |
| JP | 2002-203585 A | | 7/2002 |
| JP | 2002-305018 A | | 10/2002 |
| JP | 2002-367642 A | | 12/2002 |

* cited by examiner

*Primary Examiner*—Gregg Cantelmo
(74) *Attorney, Agent, or Firm*—Kenyon & Kenyon LLP

(57) ABSTRACT

The voltage application unit first applies voltages (+,+,0,−,−,0) respectively to the electrostatic delivery electrodes 37 belonging to the phase 'a', the phase 'b', the phase 'c', the phase 'd', the phase 'e', and the phase 'f', and then successively applies voltages (0,+,+,0,−,−), voltages (−,0,+,+,0,−), voltages (−,−,0,+,+,0), voltages (0,−,−,0,+,+), and voltages (+,0,−,−,0,+). The voltage application unit repeats this cycle multiple times to apply the voltages to the phase 'a' through the phase 'f'. The water droplets flocculated in the oxidizing gas conduits 36 are charged by electrostatic induction and travel in the direction from the inlet to the outlet of the oxidizing gas conduits 36 while being repelled or attracted by the electrostatic delivery electrodes 37 in the vicinity of the water droplets in the course of the positive-negative variation of the voltage in the cycle.

13 Claims, 7 Drawing Sheets

FUEL CELL SYSTEM AND VEHICLE WITH FUEL CELL SYSTEM MOUNTED THEREON

This is a 371 national phase application of PCT/JP2004/002016 filed 20 Feb. 2004, claiming priority to Japanese Patent Application No. 2003-140987 filed 19 May 2003, the contents of which are incorporated herein by reference.

BACKGROUND ART

A proposed fuel cell system includes: fuel cells that generate electric power through electrochemical reactions of oxygen included in an oxidizing gas, which is flown through oxidizing gas conduits provided on a cathode side of respective electrolyte membranes, with hydrogen included in a fuel gas, which is flown through fuel gas conduits provided on an anode side of the electrolyte membranes; piezoelectric elements that are located in the oxidizing gas conduits and are displaced by a driving voltage; and vibrators that are also located in the oxidizing gas conduits and vibrate with the displacement of the piezoelectric elements (for example, see Patent Laid-Open Gazette No. 2002-184430). In this fuel cell system, water produced by the electrochemical reactions on the cathode side may be flocculated to water droplets and prevent the smooth flow of the oxidizing gas. In such cases, the piezoelectric element is displaced to trigger vibration of the vibrator. The vibration atomizes the water content on the surface of the cathode, thereby removing the water content.

This prior art fuel cell system is, however, required to locate the piezoelectric elements and the vibrators functioning as the movable members in the restricted space of the gas conduit. This undesirably complicates the structure. Another problem is that atomization of the water droplets flocculated in the gas conduits may take a relatively long time.

DISCLOSURE OF THE INVENTION

By taking into account the drawbacks of the prior art technique discussed above, the object of the present invention is to provide a fuel cell system that effectively removes the water content from the gas conduit by the simple structure. The object of the invention is also to provide a fuel cell system that delivers water droplets intact out of the gas conduit. The object of the invention is further to provide a vehicle having these fuel cell systems mounted thereon.

In order to achieve at least part of aforementioned objects, the fuel cell system and the vehicle having the fuel cell system mounted thereon are constructed as follows.

A fuel cell system of the present invention includes: a fuel cell that generates electric power through electrochemical reactions of oxygen included in an oxidizing gas, which is flown through an oxidizing gas conduit provided on a cathode side of an electrolyte membrane, with hydrogen included in a fuel gas, which is flown through a fuel gas conduit provided on an anode side of the electrode membrane; and an electrostatic delivery module that is provided in at least one of the fuel gas conduit and the oxidizing gas conduit and effectuates electrostatic delivery of water droplets flocculated in the at least one gas conduit to deliver the water droplets out of the gas conduit.

This fuel cell system effectuates electrostatic delivery of water droplets flocculated in the gas conduit and thereby delivers the water droplets out of the gas conduit. Namely the technique utilizes the electrostatic force to remove the water content from the gas conduit. This simple structure effectively removes the water content from the gas conduit without placing any movable member like a vibrator in the gas conduit and without atomizing the water droplets flocculated in the gas conduit. The water produced by the electrochemical reaction is readily flocculated in the gas conduit. It is thus preferable that the electrostatic delivery module is provided in the oxidizing gas conduit. The electrostatic delivery module may electrostatically deliver the water droplets flocculated in the gas conduit toward its outlet or toward its inlet.

A fuel cell system of the present invention includes: a fuel cell that generates electric power through electrochemical reactions of oxygen included in an oxidizing gas, which is flown through an oxidizing gas conduit provided on a cathode side of an electrolyte membrane, with hydrogen included in a fuel gas, which is flown through a fuel gas conduit provided on an anode side of the electrode membrane; multiple electrodes that are arranged in at least one of the fuel gas conduit and the oxidizing gas conduit and are covered with an insulator layer; and a voltage application module that applies a voltage to the multiple electrodes to effectuate electrostatic delivery of water droplets flocculated in the at least one gas conduit and thereby deliver the water droplets out of the gas conduit.

This fuel cell system applies the voltage to the multiple electrodes, which are arranged in the gas conduit, to effectuate electrostatic delivery of the water droplets flocculated in the gas conduit and thereby remove the water content from the gas conduit. Namely the technique utilizes the electrostatic force to remove the water content from the gas conduit. This simple structure effectively removes the water content from the gas conduit without placing any movable member like a vibrator in the gas conduit and without atomizing the water droplets flocculated in the gas conduit. The water produced by the electrochemical reaction is readily flocculated in the oxidizing gas conduit. It is thus preferable that the electrostatic delivery module is provided in the oxidizing gas conduit. The voltage application module may apply the voltage to the multiple electrodes to effectuate electrostatic delivery of the water droplets flocculated in the gas conduit toward its outlet or to effectuate electrostatic delivery of the water droplets flocculated in the gas conduit toward its inlet.

In this fuel cell system of the invention, it is preferable that the voltage application module applies the voltage to the multiple electrodes to make an apparent positive-negative variation in voltage toward either the outlet or the inlet of the gas conduit. This arrangement efficiently leads the water droplets flocculated in the gas conduit toward either its outlet or its inlet. The voltage application module may apply the voltage to the multiple electrodes to make an apparent positive-negative variation in voltage toward one of the outlet and the inlet of the gas conduit, which is located below the other. This structure desirably takes advantage of the force of gravity acting on the water droplets.

In the fuel cell system of the invention, the multiple electrodes may be placed at a specific position of the gas conduit having a high potential for flocculation to water droplets. The multiple electrodes may be located in the whole oxidizing gas conduit or in the whole fuel gas conduit. It is, however, preferable to place the multiple electrodes at any specific position having a high potential for flocculation to water droplets, because of the structural characteristic of the fuel cell. This arrangement does not place the electrodes at a position having a low potential for flocculation to water droplets and thereby desirably saves the electrode resource.

In one preferable embodiment of the fuel cell system of the invention, the fuel cell has a membrane electrode assembly that includes the anode and the cathode arranged across the electrolyte membrane, and a pair of electrically conductive separators that are placed across the membrane electrode assembly. The oxidizing gas conduit is defined by the cathode and a groove formed in one of the pair of electrically conductive separators. The fuel gas conduit is defined by the anode and a groove formed in the other of the pair of electrically conductive separators. The multiple electrodes are placed in the groove of at least one of the fuel gas conduit and the oxidizing gas conduit. In this structure, the multiple electrodes covered with the insulator layer are arranged in the groove formed in the electrically conductive separator, which is not in contact with the anode or the cathode. Such positioning of these electrodes does not damage the electric conductivity between the anode or the cathode and the electrically conductive separator.

In another preferable embodiment, the fuel cell system of the invention further includes: a driving state detection module that detects a driving state of the fuel cell; and a voltage application control module that determines actuation or non-actuation of the voltage application module to apply or not to apply the voltage to the multiple electrodes, based on the detected driving state of the fuel cell. The voltage application module may be controlled to continuously apply the voltage to the multiple electrodes and thereby effectuate electrostatic delivery of the water droplets during an operation of the fuel cell. The determination of application or non-application of the voltage to the multiple electrodes according to the driving state of the fuel cell, however, desirably saves the power consumption.

The fuel cell system of this preferable embodiment may further include a driving state specification module that determines whether the driving state of the fuel cell detected by the driving state detection module reaches a predetermined driving state having a high potential for flocculation to water droplets in the gas conduit. The voltage application control module actuates the voltage application module to apply the voltage to the multiple electrodes, when the driving state specification module determines that the detected driving state of the fuel cell reaches the predetermined driving state. The arrangement starts application of the voltage to the multiple electrodes for electrostatic delivery of the water droplets out of the gas conduit, when the gas conduit falls into the state having a high potential for flocculation to water droplets. This prevents unnecessary power consumption. Here the 'driving state of the fuel cell' may be, for example, any of a power demand to the fuel cell and an output power, an integral power, and an output voltage of the fuel cell. The fuel cell system of this preferable embodiment may still further include a driving state specification module that determines whether the driving state of the fuel cell detected by the driving state detection module represents an excess water content. The voltage application control module actuates the voltage application module to apply the voltage to the multiple electrodes, when the driving state specification module determines that the detected driving state of the fuel cell represents the excess water content.

In still another preferable embodiment, the fuel cell system of the invention further includes a voltage application control module that controls the voltage application module to continuously apply the voltage to the multiple electrodes and thereby effectuate electrostatic delivery of the water droplets during an operation of the fuel cell.

A vehicle of the present invention has the fuel cell system of any of the above arrangements mounted thereon. The fuel cell system of any arrangement discussed above effectively removes the water content from the gas conduit without placing any movable member like a vibrator in the gas conduit and without atomizing the water droplets flocculated in the gas conduit. The vehicle with this fuel cell system mounted thereon naturally exerts the equivalent functions and effects to those of the fuel cell system discussed above.

BEST MODES FOR CARRYING OUT THE INVENTION

Figure 1:
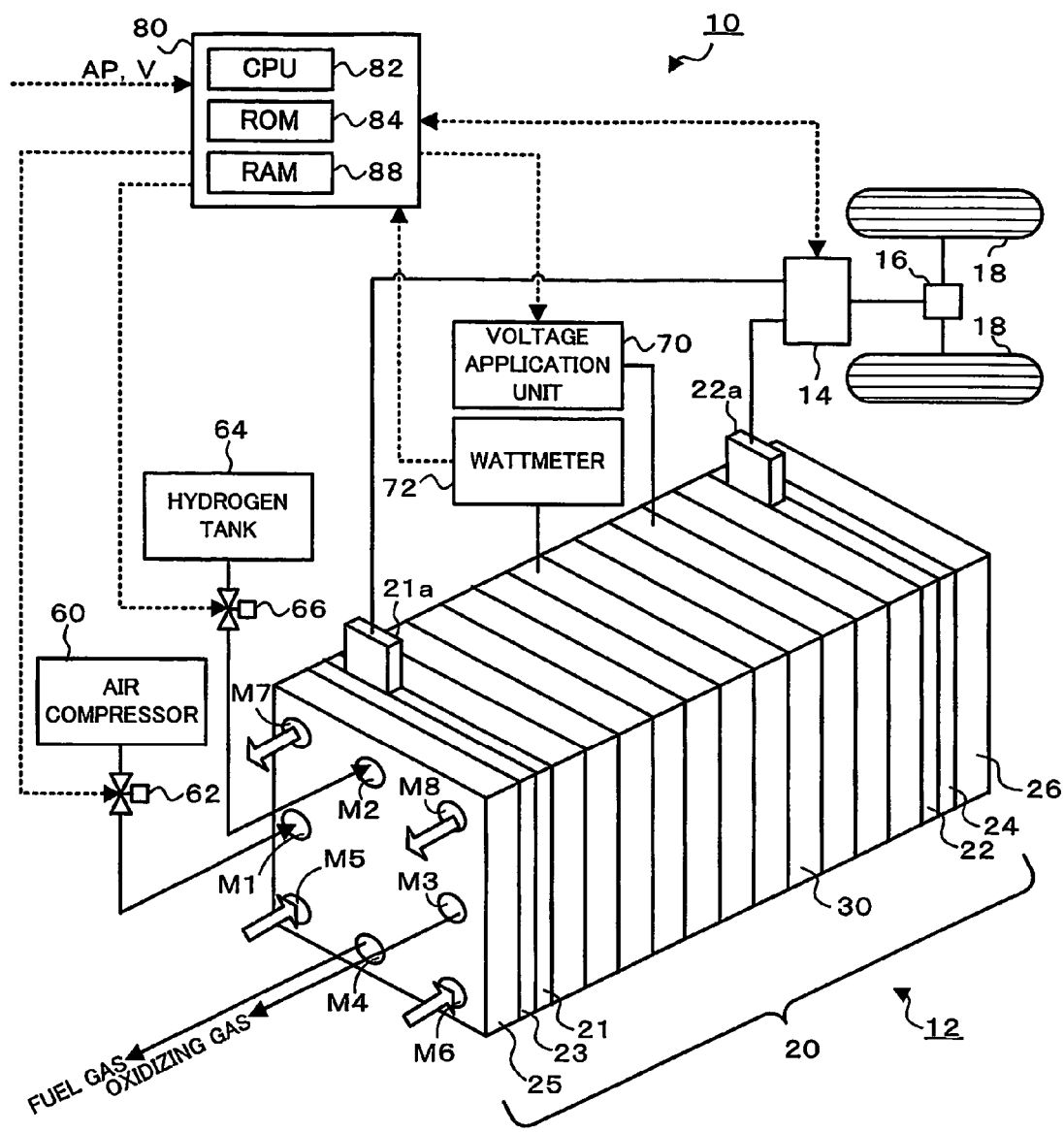
FIG. 1 schematically illustrates the construction of a vehicle with a fuel cell system mounted thereon in one embodiment.
Figure 2:
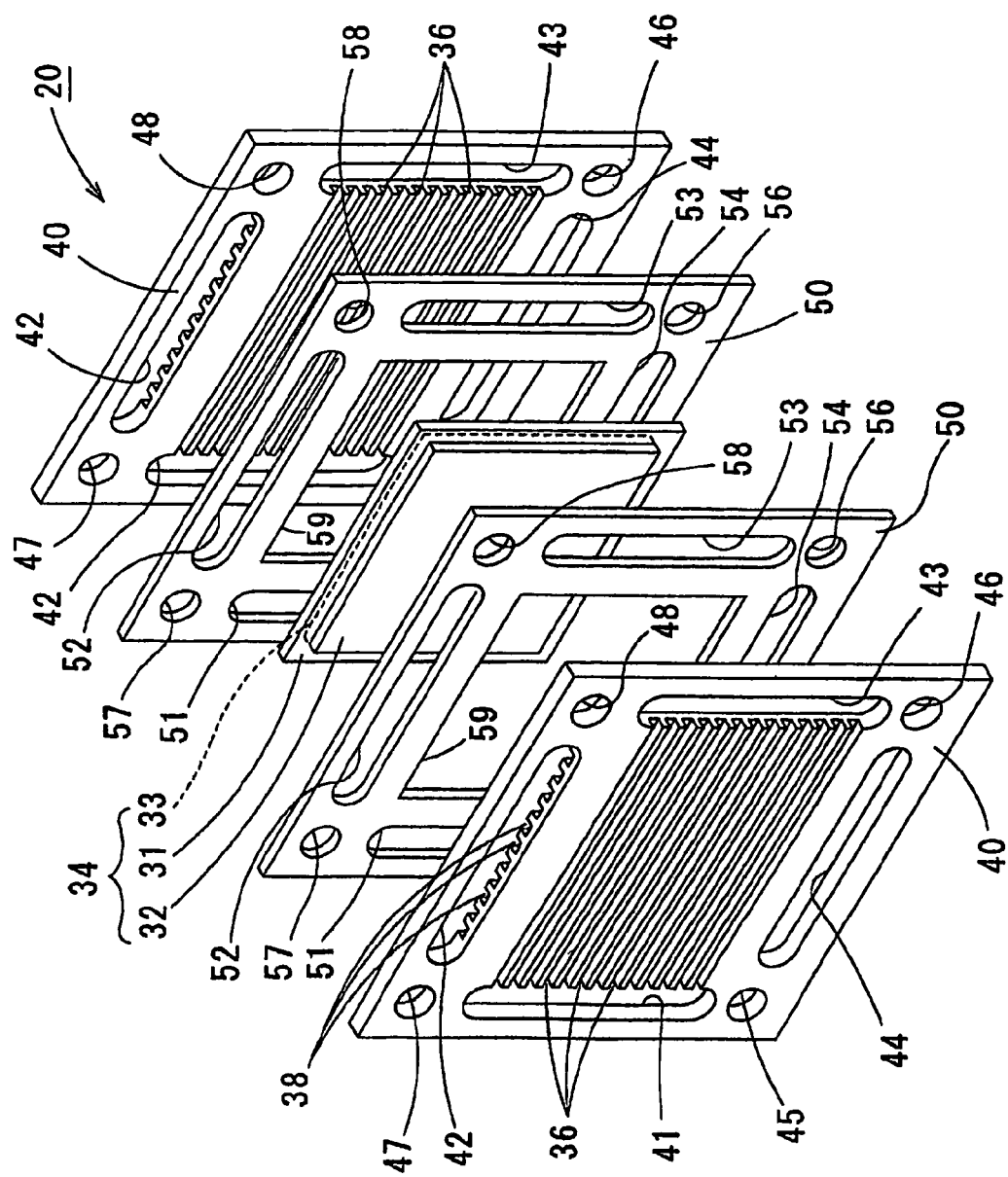
FIG. 2 is a decomposed perspective view showing a unit fuel cell.
Figure 3:
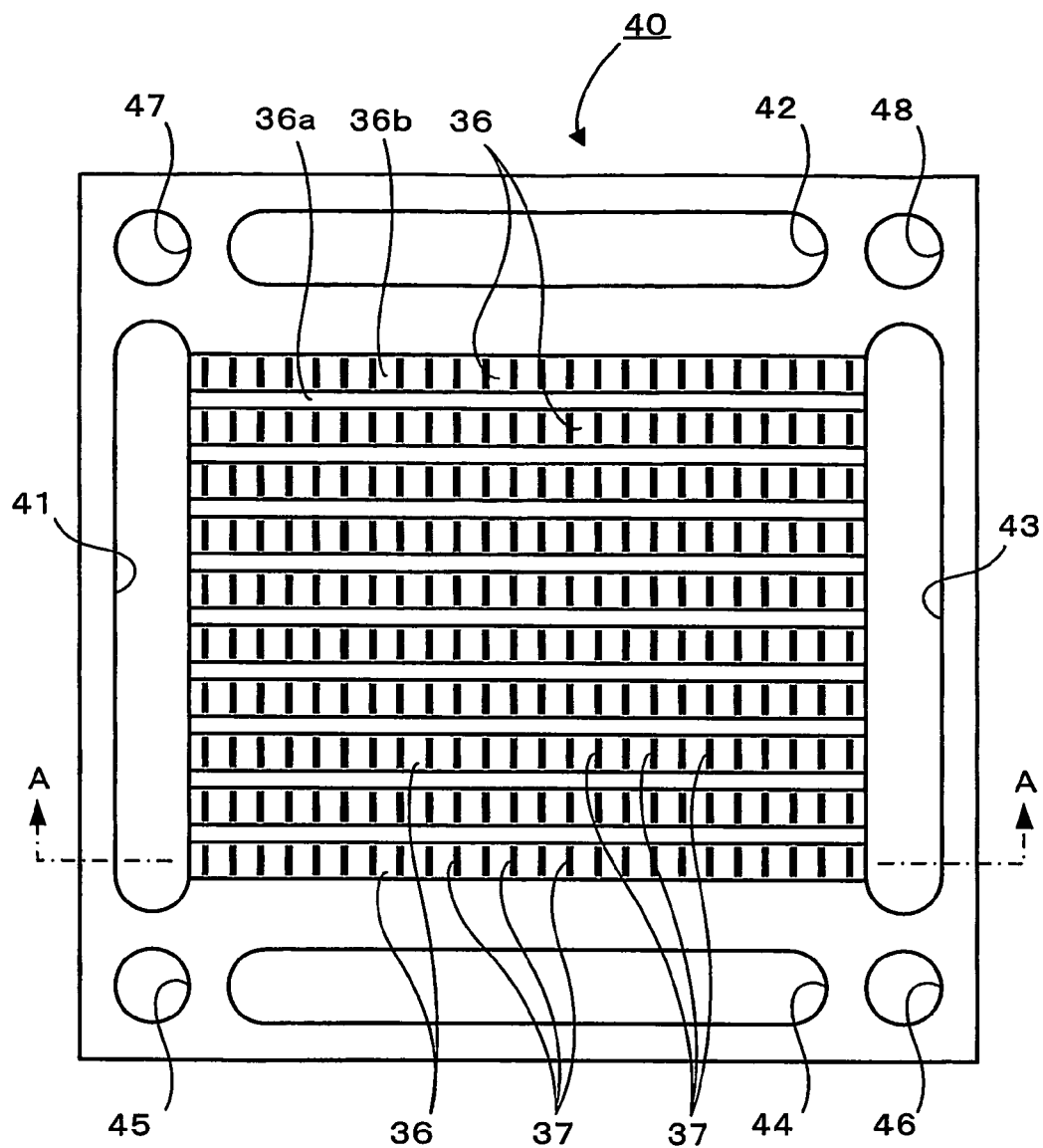
FIG. 3 is a plan view showing a separator with oxidizing gas conduits formed thereon.
Figure 4:
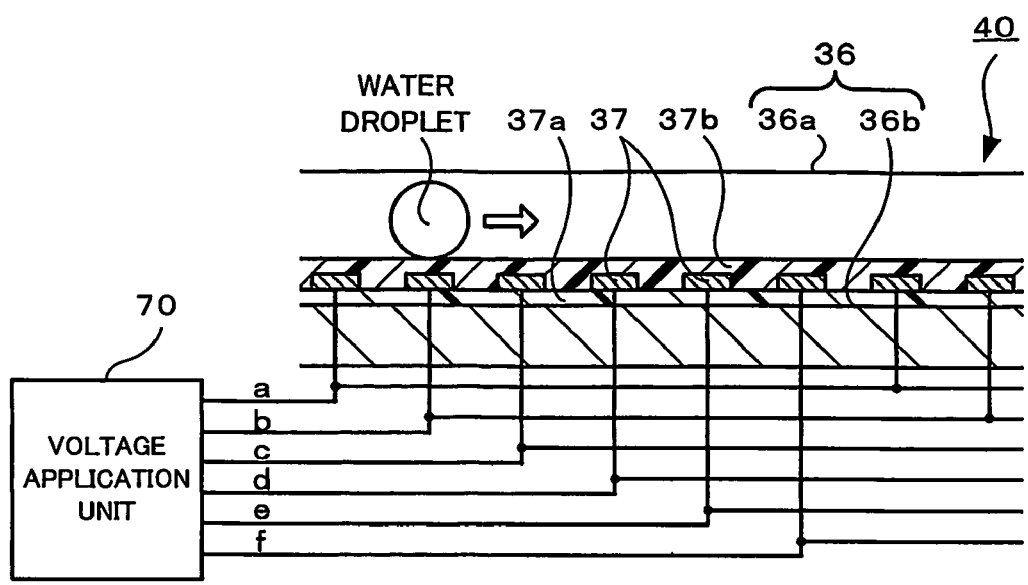
FIG. 4 is a sectional view taken on the line A-A of FIG. 3.
Figure 5:
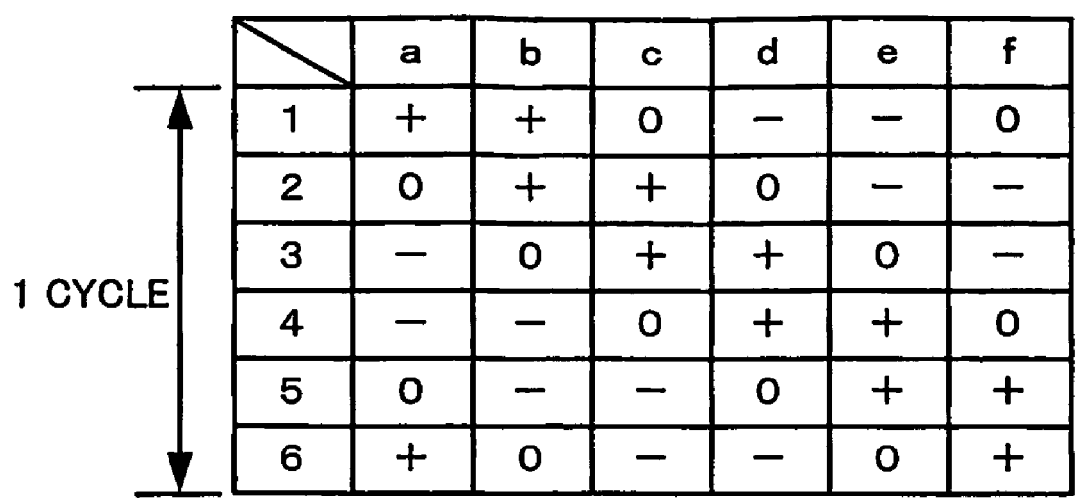
FIG. 5 shows a voltage application pattern.

One mode of carrying out the invention is discussed below with reference to the drawings. FIG. 1 schematically illustrates the construction of a vehicle 10 with a fuel cell system 12 mounted thereon. FIG. 2 is a decomposed perspective view showing a unit fuel cell 30. FIG. 3 is a plan view showing a separator with oxidizing gas conduits formed thereon, and FIG. 4 is a sectional view taken on the line A-A of FIG. 3. FIG. 5 shows a voltage application pattern.

As shown in FIG. 1, the vehicle 10 of this embodiment includes a fuel cell system 12, an actuation mechanism 14 that converts a supply of electric power from the fuel cell system 12 into driving force and rotates driving wheels 18, 18 via a reduction gear 16 with the driving force, and an electronic control unit 80 that controls the whole vehicle 10. The fuel cell system 12 has a fuel cell stack 20, which is a stack of multiple unit fuel cells 30 generating electric power through electrochemical reactions of hydrogen and oxygen, supply manifolds M1 and M2 to feed supplies of an oxidizing gas and a gaseous fuel to the respective unit fuel cells 30, and exhaust manifolds M3 and M4 to lead exhausts of the oxidizing gas and the gaseous fuel, which have passed through the respective unit fuel cells 30, out of the fuel cell stack 20. The vehicle 10 of the embodiment also has multiple electrostatic delivery electrodes 37 (see FIG. 3) that function to electrostatically deliver water droplets in a direction from the inlet to the outlet of the oxidizing gas conduits 36, and a voltage application unit 70 that applies voltages to these electrostatic delivery electrodes 37.

The fuel cell stack 20 is manufactured by stacking a plurality of the unit fuel cells 30 as base units and sequentially arranging a pair of collector plates 21 and 22, a pair of insulator plates 23 and 24, and a pair of end plates 25 and 26 on respective ends of the stack of the unit fuel cells 30. The collector plates 21 and 22 are composed of a gas-impermeable electric conductive material, such as dense carbon or copper. The insulator plates 23 and 24 are composed of an insulating material, such as rubber or resin. The end plates 25 and 26 are composed of a metal having rigidity, such as steel. The collector plates 21 and 22 respectively have output terminals 21*a* and 22*a* to output an electromotive force generated by the fuel cell stack 20. A holder mechanism (not shown) causes the end plates 25 and 26 to hold the respective unit cells 30 under pressure applied in its stacking direction.

As shown in FIG. 2, each of the unit fuel cells 30 has a membrane electrode assembly (MEA) 34 including an anode 32 and a cathode 33 arranged across an electrolyte membrane 31, and a pair of separators 40, 40 disposed on both ends of the MEA 34. The electrolyte membrane 31 has good proton conductivity in its wet state. A Nafion membrane manufactured by DuPont is preferably applied for the electrolyte membrane 31. Each of the anode 32 and the cathode 33 has a catalyst electrode with platinum or an alloy of platinum and another metal carried thereon and a gas diffusion electrode of carbon cloth, which is a woven fabric of carbon fibers. The MEA 34 is obtained by integrating the anode 32, the electrolyte membrane 31, and the cathode 33 by thermo compression. Each of the separators 40 is composed of a gas-impermeable electric conductive material, for example, mold carbon obtained by compressing carbon to be gas impermeable. As shown in FIG. 2, an oxidizing gas supply port 41 and an oxidizing gas exhaust port 43 penetrating the separator 40 are formed on the approximate centers of a left side and a right side of the separator 40. A gaseous fuel supply port 42 and a gaseous fuel exhaust port 44 penetrating the separator 40 are also formed on the approximate centers of an upper side and a lower side of the separator 40. Circular apertures 45 through 48 penetrating the separator 40 for circulation of cooling water are also formed on four corners of the separator 40. Multiple grooves 36b (See FIG. 4) going from the oxidizing gas supply port 41 to the oxidizing gas exhaust port 43 form an oxidizing gas conduit 36 on one face of the separator 40. Similarly multiple grooves going from the gaseous fuel supply port 42 to the gaseous fuel exhaust port 44 form a gaseous fuel conduit 38 on the other face of the separator 40. The multiple electrostatic delivery electrodes 37 are interposed between a lower insulator layer 37a and an upper insulator layer 37b on the bottom of grooves 36b, which define the oxidizing gas conduits 36, and are arrayed along the path going from the inlet to the outlet, as shown in FIG. 4.

Gaskets 50 are interposed between the MEA 34 and the respective separators 40, as shown in FIG. 2. The gaskets 50 are arranged across the electrolyte membrane 31 to restrain leakage of the gaseous fuel and the oxidizing gas and to prevent the flow of the oxidizing gas from being mixed with the flow of the gaseous fuel in the space between the separators 40, 40. Each of the gaskets 50 has slots 51 through 54 perforated to face the oxidizing gas supply port 41, the gaseous fuel supply port 42, the oxidizing gas exhaust port 43, and the gaseous fuel exhaust port 44 of the separator 40 respectively, circular apertures 55 through 58 perforated to face the circular apertures 45 through 48 respectively (the circular aperture 55 is omitted from the illustration), and a square hole formed in a size to receive the anode 32 or the cathode 33 therein.

Among the supply manifolds, the oxidizing gas supply manifold M1 is a hollow space of connecting the oxidizing gas supply port 41 of the separator 40 with the slot 51 of the gasket 50 in the respective unit fuel cells 30 in the stacking direction of the fuel cell stack 20. A supply of the air as the oxidizing gas is fed from an air compressor 60 via a flow control valve 62, is humidified by a non-illustrated humidifier, and is flown into the oxidizing gas supply manifold M1. The gaseous fuel supply manifold M2 is a hollow space of connecting the gaseous fuel supply port 42 of the separator 40 with the slot 52 of the gasket 50 in the respective unit fuel cells 30 in the stacking direction of the fuel cell stack 20. A supply of gaseous hydrogen as the gaseous fuel is fed from a hydrogen tank 64 via a flow control valve 66, is humidified by a non-illustrated humidifier, and is flown into the gaseous fuel supply manifold M2. Cooling water inflow manifolds M5 and M6 are respectively hollow spaces of connecting the circular apertures 45 and 46 of the separator 40 with the circular apertures 55 and 56 of the gasket 50 in the respective unit fuel cells 30 in the stacking direction of the fuel cell stack 20. A flow of cooling water as the coolant is fed from a non-illustrated pump and is flown into the cooling water inflow manifolds M5 and M6.

Among the exhaust manifolds, the oxidizing gas exhaust manifold M3 is a hollow space of connecting the oxidizing gas exhaust port 43 of the separator 40 with the slot 53 of the gasket 50 in the respective unit fuel cells 30 in the stacking direction of the fuel cell stack 20. The exhaust of the oxidizing gas, which has passed through the oxidizing gas conduits 36 of the respective unit fuel cells 30, is collectively led out of the fuel cell stack 20. The gaseous fuel exhaust manifold M4 is a hollow space of connecting the gaseous fuel exhaust port 44 of the separator 40 with the slot 54 of the gasket 50 in the respective unit fuel cells 30 in the stacking direction of the fuel cell stack 20. The exhaust of the gaseous fuel, which has passed through the gaseous fuel conduits 38 of the respective unit fuel cells 30, is collectively led out of the fuel cell stack 20. The exhaust of the gaseous fuel still includes non-reacted hydrogen and may thus be re-circulated into the gaseous fuel supply manifold M2. Cooling water outflow manifolds M7 and M8 are respectively hollow spaces of connecting the circular apertures 47 and 48 of the separator 40 with the circular apertures 57 and 58 of the gasket 50 in the respective unit fuel cells 30 in the stacking direction of the fuel cell stack 20. The hot flow of cooling water, which has passed through cooling water conduits formed in cooling water separators (not shown) disposed at intervals of several unit fuel cells 30 in the fuel cell stack 20, is collectively led out of the fuel cell stack 20. The hot flow of cooling water is cooled down by means of a non-illustrated radiator and is re-circulated into the cooling water inflow manifolds M5 and M6.

The multiple electrostatic delivery electrodes 37 are arrayed along the path going from the inlet to the outlet of the respective oxidizing gas conduits 36, as shown in FIGS. 3 and 4. The electrostatic delivery electrodes 37 are placed on the lower insulator layer 37a, which covers the bottom surface of the grooves 36b of the respective oxidizing gas conduits 36, and are covered with the upper insulator layer 37b. These electrostatic delivery electrodes 37 are linear electrodes of 0.2 mm in width (where the width represents the length along the conduit) and are arranged at pitches of 0.5 to 1 mm. The electrostatic delivery electrodes 37 are divided into six phases, phases 'a' through 'f', according to a voltage pattern applied thereto. The wires of the electrostatic delivery electrodes 37 in each phase are joined to one wiring, which is connected to the voltage application unit 70. For example, the known printed wiring board production technique is applied to prepare the electrostatic delivery electrodes 37 and their wiring pattern.

The voltage application unit 70 applies voltages to the multiple electrostatic delivery electrodes 37 according to a voltage application pattern shown in FIG. 5. The voltage application unit 70 applies an identical voltage to plural electrostatic delivery electrodes 37 belonging to an identical phase among the phases 'a' through 'f'.

The actuation mechanism 14 (see FIG. 1) has a power converter to convert the d.c. power generated by the fuel cell stack 20 into a.c. power and a traction motor driven and rotated with the converted a.c. power, although not being specifically illustrated.

Referring back to FIG. 1, the electronic control unit 80 is constructed as a microprocessor including a CPU 82, a ROM 84 that stores processing programs, a RAM 86 that temporarily stores data, and an input-output port (not shown). The electronic control unit 80 receives, as inputs via the input port, an accelerator pedal opening signal AP sent from an accelerator pedal sensor (not shown), a vehicle speed signal V sent from a vehicle speed sensor (not shown), a measurement of integral power of the fuel cell detected by and sent from a wattmeter 72, and an input-output voltage signal of the power converter included in the actuation mechanism 14. The electronic control unit 80 outputs control signals to the voltage application unit 70, as well as to the power converter and the traction motor included in the actuation mechanism 14 via the output port.

The operations of the vehicle 10 of the embodiment having the above construction are described below. The description first regards the process of electrostatic delivery of water droplets flocculated in the oxidizing gas conduits 36 in the direction from their inlet to their outlet. According to the voltage application pattern shown in FIG. 5, the voltage application unit 70 first applies voltages (+,+,0,−,−,0) respectively to the electrostatic delivery electrodes 37 belonging to the phase 'a', the phase 'b', the phase 'c', the phase 'd', the phase 'e', and the phase 'f' (No. 1 of FIG. 5). The voltage application unit 70 then successively applies voltages (0,+,+,0,−,−) (No. 2 of FIG. 5), voltages (−,0,+,+,0,−) (No. 3 of FIG. 5), voltages (−,−,0,+,+,0) (No. 4 of FIG. 5), voltages (0,−,−, 0,+,+) (No. 5 of FIG. 5), and voltages (+,0,−,−,0,+) (No. 6 of FIG. 5). The structure of this embodiment repeats this cycle of No. 1 to No. 6 multiple times to apply the voltages to the phase 'a' through the phase 'f'. Namely the voltage application unit 70 applies voltages of 6-phase rectangular waves. As clearly shown by the positive-negative change of the voltage in the cycle of No. 1 to No. 6 of FIG. 5, an apparent positive-negative variation in voltage proceeds in the direction from the inlet to the outlet of the oxidizing gas conduits 36 with elapse of time. The water droplets flocculated in the oxidizing gas conduits 36 are charged by electrostatic induction and travel in the direction from the inlet to the outlet of the oxidizing gas conduits 36 while being repelled or attracted by the electrostatic delivery electrodes 37 in the vicinity of the water droplets in the course of the positive-negative variation of the voltage in the cycle of No. 1 to No. 6 shown in FIG. 5. In this manner, the voltage application unit 70 applies the voltages to the multiple electrostatic delivery electrodes 37 according to the voltage application pattern of FIG. 5. This effectuates electrostatic delivery of the water droplets flocculated in the oxidizing gas conduits 36 in the direction from their inlet to their outlet.

Figure 6:
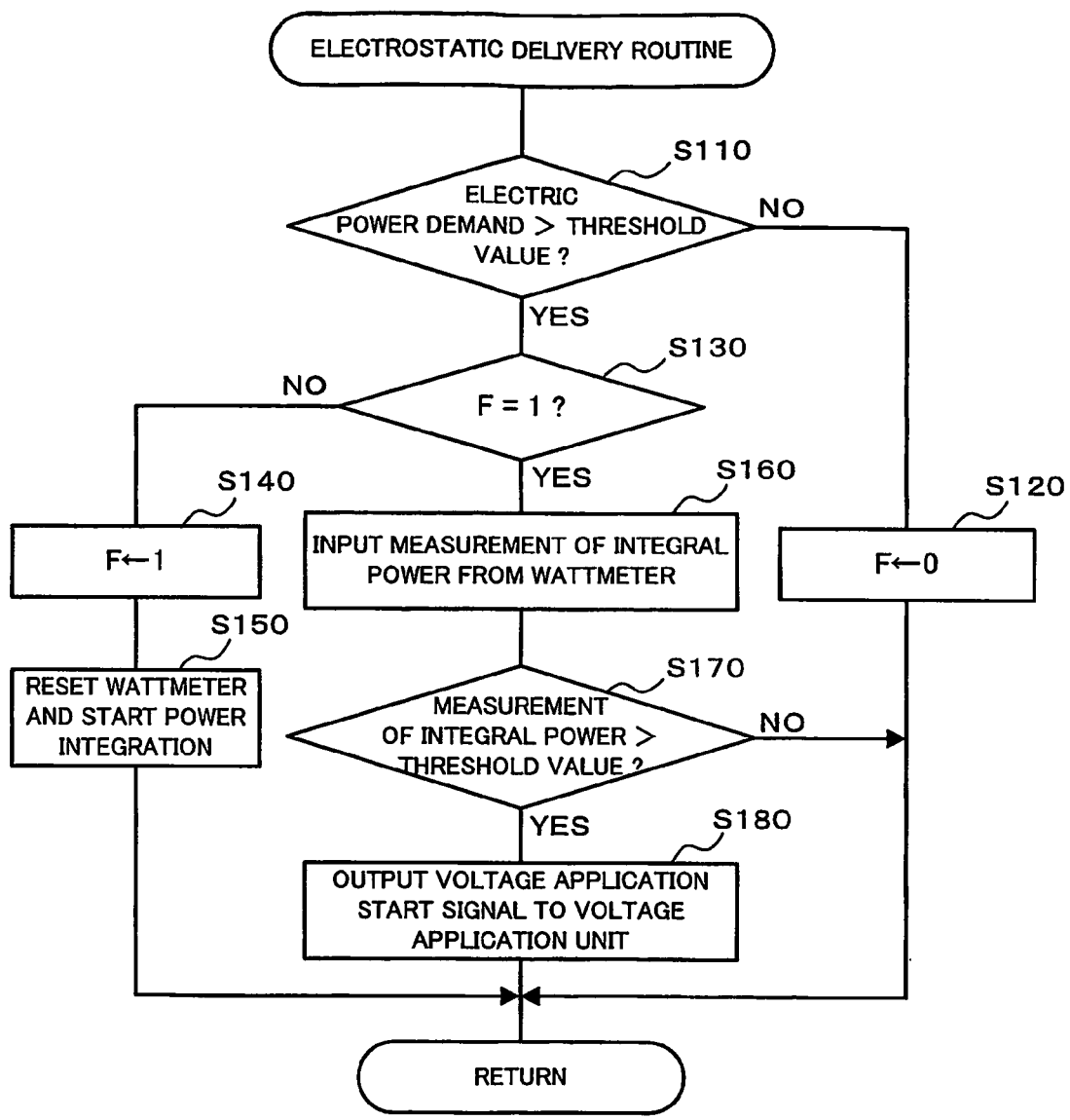
FIG. 6 is a flowchart showing an electrostatic delivery routine.

The water droplets flocculated in the oxidizing gas conduits 36 during a run of the vehicle are removed as discussed below. FIG. 6 is a flowchart showing an electrostatic delivery routine executed by the CPU 82 of the electronic control unit 80. This routine is stored in the ROM 84 and is repeatedly executed by the CPU 82 at preset time intervals (for example, at every several msec). When this routine starts, the CPU 82 first compares an electric power demand to the fuel cell stack 20 with a preset threshold value T1 to determine whether a high power output is demanded to the fuel cell stack 20 (step S110). The electric power demand to the fuel cell stack 20 is calculated from a vehicle power demand to the drive wheels 18, 18, which is specified corresponding to current inputs of a vehicle speed signal V and an accelerator pedal opening signal AP by referring to a non-illustrated map stored in the ROM 84. The threshold value T1 is empirically set in advance. The higher output of the fuel cell stack 20 causes the more vigorous electrochemical reaction to produce a large amount of water. The large amount of water is readily flocculated in the oxidizing gas conduits 36 to interfere with the smooth flow of the oxidizing gas. The procedure experimentally determines the relation between the amount of flocculated water in the oxidizing gas conduits 36 and the output power of the fuel cell stack 20 and sets the output power of the fuel cell stack 20 at the time when the amount of flocculated water possibly interferes with the smooth flow of the oxidizing gas, to the threshold value T1.

When it is determined at step S110 that the electric power demand to the fuel cell stack 20 does not exceed the preset threshold value T1, the CPU 82 resets a high output flag F to '0' (step S120) and immediately terminates this routine. When it is determined at step S110 that the electric power demand to the fuel cell stack 20 exceeds the preset threshold value T1, on the other hand, the CPU 82 subsequently determines whether the high output flag F is set equal to '1' (step S130). When the high output flag F is not equal to '1', the CPU 82 sets the value '1' to the high output flag F to indicate the status of a high power demand to the fuel cell stack 20 (step S140). The CPU 82 then resets the measurement of integral power on a wattmeter 72 and starts power integration (step S150), before terminating this routine.

When it is determined at step S130 that the high output flag F is equal to '1', this means that the high power output has already been demanded to the fuel cell stack 20 in the previous cycle of this routine. In this case, the CPU 82 inputs the measurement of integral power from the wattmeter 72 (step S160) and compares the input measurement of integral power with a preset threshold value T2 (step S170). Even when it is determined at step S110 that the electric power demand exceeds the threshold value T1, the electric power demand may soon become lower than the threshold value T1. This means that the measurement of integral power does not reach a specific level, after the electric power demand has once exceeded the threshold value T1. In this case, the electrochemical reaction becomes vigorous only temporarily and does not cause flocculation of water. In another case, the electric power demand continuously exceeds the threshold value T1 for a relatively long time period. This means that the measurement of integral power reaches the specific level, while the electric power demand exceeds the threshold value T1. This state often leads to flocculation of water. This specific level of the integral power is thus determined experimentally and is set to the threshold value T2.

When it is determined at step S170 that the measurement of integral power does not exceed the preset threshold value T2, the CPU 82 immediately exits from this routine. When it is determined at step S170 that the measurement of integral power exceeds the preset threshold value T2, on the other hand, there is a possibility of flocculation of water. The CPU 82 accordingly outputs a voltage application start signal to the voltage application unit 70 (step S180), before exiting from this routine. The voltage application unit 70 receives the voltage application start signal and applies the voltages to the multiple electrostatic delivery electrodes 37 according to the voltage application pattern shown in FIG. 5 for a preset time period. Such voltage application induces electrostatic delivery of the flocculated water in the oxidizing gas conduits 36 in the direction from their inlet to their outlet by the mechanism discussed above.

As described above, the simple structure of this embodiment utilizes the electrostatic force to effectively remove the flocculated water from the oxidizing gas conduits 36 without locating any movable members like vibrators in the oxidizing gas conduits 36 and without atomizing the water flocculated in the oxidizing gas conduits 36. The voltage application unit 70 applies the voltages to the multiple electrostatic delivery electrodes 37 to make an apparent positive-negative variation in voltage toward the outlet of the oxidizing gas conduits 36. This arrangement efficiently leads the flocculated water in the oxidizing gas conduits 36 to the oxidizing gas exhaust manifold M3. The multiple electrostatic delivery electrodes 37 are arrayed on the bottom of the grooves 36b of the oxidizing gas conduits 36 formed on the separator 40, which are not to be in contact with the cathode 33, and are covered with the lower insulator layer 37a and the upper insulator layer 37b. The presence of these electrostatic delivery electrodes 37 does not reduce the contact area of the separator 40 with the cathode 33 (that is, the area of a convex face 36a of the separator 40), thus keeping the sufficient electric conductivity. The voltage application unit 70 is controlled to apply the voltages to the multiple electrostatic delivery electrodes 37 only when there is a high possibility of producing flocculated water in the oxidizing gas conduits 36 (that is, only when the electric power demand exceeds the threshold value T1 and the measurement of integral power reaches the specific level). This arrangement desirably saves the power consumption, compared with the structure of unconditionally applying voltages even when there is no need of electrostatic delivery. Another possible technique raises the pressure of the oxidizing gas supply to the oxidizing gas supply manifold M1 and blows off the flocculated water. This method, however, requires a large capacity of the air compressor 60, which occupies a large space. The arrangement of the embodiment, on the other hand, does not need to blow off the flocculated water by the increased pressure of the oxidizing gas supply, thus desirably reducing the required size and capacity of the air compressor 60. The technique of the invention may, however, be combined with the structure of blowing off the flocculated water, according to the requirements.

The embodiment discussed above is to be considered in all aspects as illustrative and not restrictive. There may be many other modifications, changes, and alterations without departing from the scope or spirit of the main characteristics of the present invention. All changes within the meaning and range of equivalency of the claims are therefore intended to be embraced therein.

For example, in the structure of the embodiment, the voltage application unit 70 is controlled to apply the voltages to the multiple electrostatic delivery electrodes 37 only when the electric power demand exceeds the threshold value T1 and the measurement of integral power reaches the specific level. In one possible modification, the voltage application unit 70 may be controlled to apply the voltages to the multiple electrostatic delivery electrodes 37 when the electric power demand exceeds the threshold value T1. In another possible modification, the voltage application unit 70 may be controlled to apply the voltages to the multiple electrostatic delivery electrodes 37 every time the measurement of integral power reaches a preset value (this is determined empirically as a value of power integration when flocculation of water occurs). The electrostatic delivery consumes extremely small power, so that the voltage application unit 70 may be controlled to continuously apply the voltages to the multiple electrostatic delivery electrodes 37. Another modified structure determines whether the water content in the oxidizing gas conduits 36 is an excess level and controls the voltage application unit 70 to apply the voltages to the multiple electrostatic delivery electrodes 37 under the condition of the excess water content. The level of the water content in the oxidizing gas conduits 36 may be determined by the following procedure. A voltage sensor is attached to each unit fuel cell 30 to measure its output voltage. A behavior of the output voltage under the condition of the excess water content in the oxidizing gas conduits 36 is specified experimentally and is set in advance. The procedure compares the preset behavior of the output voltage with the current behavior of the output voltage of the respective unit fuel cells 30 to determine the level of the water content.

Figure 7:
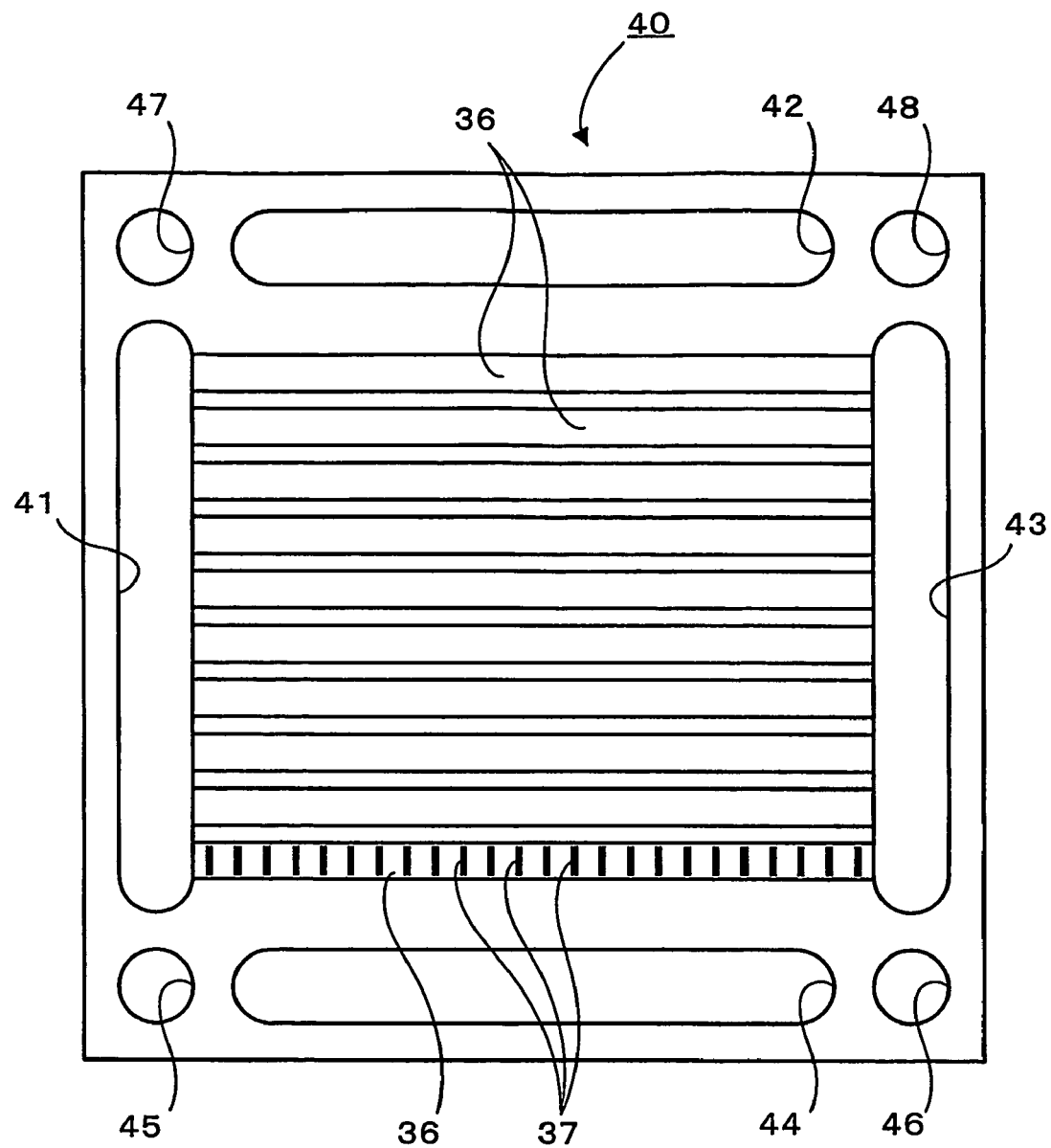
FIG. 7 is a plan view showing a separator with oxidizing gas conduits formed thereon in another embodiment.

In the structure of the embodiment discussed above, the electrostatic delivery electrodes 37 are placed in all the oxidizing gas conduits 36. In one modified structure, the electrostatic delivery electrodes 37 may be placed in only part of the oxidizing gas conduits 36 having the high potential for flocculation of water. In an illustrated example of FIG. 7, the oxidizing gas conduits 36 are extended in the horizontal direction. Due to the force of gravity, water tends to be flocculated in the lower oxidizing gas conduits 36. The electrostatic delivery electrodes 37 may be provided only in such places. This desirably saves the electrode resource.

In the structure of the embodiment discussed above, the air compressor 60 is used as the oxidizing gas supply device. A blower may replace the air compressor 60, since there is no need of significantly heightening the inlet pressure (supply pressure) of the oxidizing gas supply to blow off flocculated water by the heightened pressure of the oxidizing gas supply. The technique of electrostatic delivery for removal of flocculated water may, however, be combined with the technique of raising the inlet pressure of the oxidizing gas supply to blow off and remove flocculated water. In this case, the air compressor 60 is required to have the capacity of sufficiently raising the pressure of the oxidizing gas supply to blow off flocculated water.

The procedure of the above embodiment adopts the voltage application pattern shown in FIG. 5. Any other voltage application pattern may be used instead, to effectuate electrostatic delivery of flocculated water in the oxidizing gas conduits 36 to their outlet.

In the structure of the embodiment discussed above, the oxidizing gas conduits 36 are formed as linear grooves going from the oxidizing gas supply port 41 to the oxidizing gas exhaust port 43. The oxidizing gas conduits 36 may be formed as curved grooves or a serpentine groove. Another possible structure may mount small cubes or small rectangular parallelepipeds at preset intervals on the surface of the separator 40 and set the gaps defined by the cubes or rectangular parallelepipeds as the oxidizing gas conduits 36.

The structure of the embodiment utilizes the technique of electrostatic delivery to deliver the water droplets flocculated in the oxidizing gas conduits 36 to their outlet or the oxidizing gas exhaust manifold M3. One modified structure may alternatively deliver the water droplets flocculated in the oxidizing gas conduits 36 to their inlet or the oxidizing gas supply manifold M1 by electrostatic delivery. For example, when the inlet of the oxidizing gas conduits 36 is located below their outlet, it is preferable to take advantage of the force of gravity acting on the water droplets flocculated in the oxidizing gas conduits 36 and lead the water droplets to their inlet, instead of their outlet.

In the structure of the embodiment discussed above, the electrostatic delivery electrodes 37 are located in the oxidizing gas conduits 36. Another possible modification may place similar electrostatic delivery electrodes in the fuel gas conduits 38 to effectuate electrostatic delivery of water droplets flocculated in the fuel gas conduits 38, in addition to or in place of the above structure.

In the embodiment discussed above, the fuel cell system 12 is mounted on the vehicle 10. The fuel cell system 12 may be mounted on any other vehicles and transportation machines like trains and aircraft, and may be incorporated in any cogeneration systems installed for domestic applications and industrial applications. In any case, the fuel cell system 12 and its applications exert the equivalent functions and effects to those discussed above.

INDUSTRIAL APPLICABILITY

The technique of the invention is applicable to various transportations including automobiles, trains, and aircraft.

The invention claimed is:

1. A fuel cell system that is capable of power generation, comprising: a fuel cell that generates electric power through electrochemical reactions of oxygen included in an oxidizing gas, which is flown through an oxidizing gas conduit provided on a cathode side of an electrolyte membrane, with hydrogen included in a fuel gas, which is flown through a fuel gas conduit provided on a anode side of the electrolyte membrane; and
  an electrostatic delivery module that is provided in at least one of said fuel gas conduit and said oxidizing gas conduit and effectuates electrostatic delivery of water droplets flocculated in said at least one gas conduit to deliver the water droplets out of said gas conduit.

2. A fuel cell system that is capable of power generation, comprising:
  a fuel cell that generates electric power through electrochemical reactions of oxygen included in an oxidizing gas, which is flown through an oxidizing gas conduit provided on a cathode side of an electrolyte membrane, with hydrogen included in a fuel gas, which is flown through a fuel gas conduit provided on an anode side of the electrode membrane;
  multiple electrodes that are arranged in at least one of said fuel gas conduit and said oxidizing gas conduit and are covered with an insulator layer; and
  a voltage application module that applies a voltage to said multiple electrodes to effectuate electrostatic delivery of water droplets flocculated in said at least one gas conduit and thereby deliver the water droplets out of said gas conduit.

3. A fuel cell system in accordance with claim 2, wherein the at least one gas conduit includes an outlet or an inlet, and
  wherein said voltage application module applies the voltage to said multiple electrodes to make an apparent positive-negative variation in voltage toward either the outlet or the inlet of the at least one gas conduit.

4. A fuel cell system in accordance with claim 3, wherein one of the outlet or the inlet of the at least one gas conduit is located below the other.

5. A fuel cell system in accordance with claim 2, wherein said multiple electrodes are placed at a specific position having a high potential for flocculation to water droplets in said at least one gas conduit.

6. A fuel cell system in accordance with claim 2, wherein said fuel cell has a membrane electrode assembly that includes the anode and the cathode arranged across the electrolyte membrane, and a pair of electrically conductive separators that are placed across the membrane electrode assembly,
  said oxidizing gas conduit is defined by the cathode and a groove formed in one of the pair of electrically conductive separators,
  said fuel gas conduit is defined by the anode and a groove formed in the other of the pair of electrically conductive separators, and
  said multiple electrodes are placed in the groove of at least one of said fuel gas conduit and said oxidizing gas conduit.

7. A fuel cell system in accordance with claim 2, said fuel cell system further comprising:
  a driving state detection module that detects a driving state of said fuel cell; and
  a voltage application control module that determines actuation or non-actuation of said voltage application module to apply or not to apply the voltage to said multiple electrodes, based on the detected driving state of said fuel cell.

8. A fuel cell system in accordance with claim 7, said fuel cell system further comprising:
  a driving state specification module that determines whether the driving state of said fuel cell detected by said driving state detection module reaches a predetermined driving state having a high potential for flocculation to water droplets in said oxidizing gas conduit,
  wherein said voltage application control module actuates said voltage application module to apply the voltage to said multiple electrodes, when said driving state specification module determines that the detected driving state of said fuel cell reaches the predetermined driving state.

9. A fuel cell system in accordance with claim 7, said fuel cell system further comprising:
  a driving state specification module that determines whether the driving state of said fuel cell detected by said driving state detection module represents an excess water content,
  wherein said voltage application control module actuates said voltage application module to apply the voltage to said multiple electrodes, when said driving state specification module determines that the detected driving state of said fuel cell represents the excess water content.

10. A fuel cell system in accordance with claim 2, said fuel cell system further comprising:
  a voltage application control module that controls said voltage application module to continuously apply the voltage to said multiple electrodes and thereby effectuate electrostatic delivery of the water droplets during an operation of said fuel cell.

11. A vehicle having a fuel cell system mounted thereon, wherein said fuel cell system comprises:
  a fuel cell that generates electric power through electrochemical reactions of oxygen included in an oxidizing gas, which is flown through an oxidizing gas conduit provided on a cathode side of an electrolyte membrane, with hydrogen included in a fuel gas, which is flown through a fuel gas conduit provided on a anode side of the electrolyte membrane; and
  an electrostatic delivery module that is provided in at least one of said fuel gas conduit and said oxidizing gas conduit and effectuates electrostatic delivery of water droplets flocculated in said at least one gas conduit to deliver the water droplets out of said gas conduit.

12. A vehicle having a fuel cell system mounted thereon, wherein said fuel cell system comprises:
  a fuel cell that generates electric power through electrochemical reactions of oxygen included in an oxidizing gas, which is flown through an oxidizing gas conduit provided on a cathode side of an electrolyte membrane, with hydrogen included in a fuel gas, which is flown through a fuel gas conduit provided on an anode side of the electrode membrane;

multiple electrodes that are arranged in at least one of said fuel gas conduit and said oxidizing gas conduit and are covered with an insulator layer; and a voltage application module that applies a voltage to said multiple electrodes to effectuate electrostatic delivery of water droplets flocculated in said at least one gas conduit and thereby deliver the water droplets out of said gas conduit.

13. A vehicle in accordance with claim 12, wherein said fuel cell system further comprises:

a driving state detection module that detects a driving state of said fuel cell; and a voltage application control module that determines actuation or non-actuation of said voltage application module to apply or not to apply the voltage to said multiple electrodes, based on the detected driving state of said fuel cell.

* * * * *

UNITED STATES PATENT AND TRADEMARK OFFICE
CERTIFICATE OF CORRECTION

PATENT NO. : 7,666,540 B2
APPLICATION NO. : 10/556606
DATED : February 23, 2010
INVENTOR(S) : Nakanishi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1110 days.

Signed and Sealed this

Seventh Day of December, 2010

David J. Kappos
*Director of the United States Patent and Trademark Office*